US005237886A

United States Patent [19]
Kellar

[11] Patent Number: 5,237,886
[45] Date of Patent: Aug. 24, 1993

[54] SPLIT-WORM GEAR SET

[76] Inventor: Franz W. Kellar, 2181 Winterfield Dr., Gastonia, N.C. 28054

[21] Appl. No.: 867,394

[22] Filed: Apr. 13, 1992

[51] Int. Cl.$^5$ .................. F16H 1/16; F16H 55/24
[52] U.S. Cl. ................................ 74/440; 74/425; 74/458
[58] Field of Search ................. 74/425, 440, 458

[56] References Cited

U.S. PATENT DOCUMENTS

| 2,273,784 | 2/1942 | Kahl | 74/440 |
| 2,673,473 | 3/1954 | Phelps | 74/458 |
| 3,365,974 | 1/1968 | Lieberman | 74/458 X |
| 3,468,179 | 9/1969 | Sedgwick et al. | 74/425 |

FOREIGN PATENT DOCUMENTS

721930  1/1955  United Kingdom .................. 74/440

Primary Examiner—Allan D. Herrmann
Attorney, Agent, or Firm—Clifton Ted Hunt

[57] ABSTRACT

According to this invention, backlash is eliminated through the use of a split-worm that is preloaded by having a first part of the worm fixed in a stationary position on an input shaft and the second part of the split-worm mounted for limited axial movement along the input shaft relative to the stationary part of the split-worm. Both parts of the split-worm rotate with the input shaft, unlike the prior art. The ball gear uses recirculating balls instead of gear teeth to transmit the tangential load from one gear member to the other. The balls roll through ground grooves in the worm halves and thus drive the ball gear. The balls recirculate through an internal passage extending through the two parts of the split-worm. The ends of the internal passage communicate with the grooves on the exterior of the split-worm.

7 Claims, 6 Drawing Sheets

SPLIT-WORM GEAR SET

Field of the Invention

This invention relates to worm gear sets and, more specifically, to a worm gear set wherein the worm is split and the worm gear is a ball gear to eliminate backlash.

Background of the Invention

A worm gear set typically consists of two gears with orthogonal shaft centerlines. One component of a worm gear set is known as the worm and the other component in the set is known as the worm gear. The worm has threads running tangent to its centerline. The worm gear usually has a much larger pitch diameter than the worm. The teeth on the worm gear are usually segmented and are oriented axially to the centerline of the worm gear.

Worm gear sets are primarily used in cases where high torque, torsional stiffness, and high ratios are required. The gear tooth profile of a worm gear is a derivation of the involute gear teeth. Worm gear sets have the desirable characteristics of long life and smooth operation, and may be designed so that a worm gear set cannot be driven in reverse, if desired.

The backlash in a worm gear set is sometimes undesirable and steps have been taken to minimize it. For example, in a servo driven system with high resolution feedback, backlash can cause rough operation, reduced accuracy and poor surface finishes. It is known to reduce the backlash by altering the center distances of the gear set to the point that the gear teeth are in contact with other during both clockwise and counterclockwise rotation. This method of backlash reduction requires high quality gear profiles.

Other types of worm gear sets use a split worm to remove backlash. The two halves of the worm are rotated relative to each other so that each side of the worm loads up a different side of the worm gear.

Both methods listed above are effective initially but are not long term solutions due to gear surface wear caused by frictional resistance. These prior art backlash-compensated gear sets are also hampered by poor efficiencies and high temperatures due to the friction of the preloaded worm sliding on the worm gear. Even without a working load on the gear set, the gears wear each other as if they were operating under loaded working conditions.

Other known devices for reducing backlash while controlling friction in worm gear sets use a ball gear as the worm gear in a worm gear set with the balls at the point of transition for the purpose of reducing friction and prolonging the life of the gear surfaces. See, for example, the following patents:

| PATENT NO. | ISSUE DATE | INVENTOR | TITLE |
|---|---|---|---|
| 2,455,487 | Dec 7, 1948 | Hoffar | ANTIFRICTION WORM GEARING |
| 2,673,473 | Mar 30, 1954 | Phelps | ANTIFRICTION WORM GEARING MECHANISM |
| 3,365,974 | Jan 30, 1968 | Lieberman | ANIT-FRICTION WORM GEARING |
| | | | DRIVE |

The use of a ball gear is an improvement because it reduces the friction encountered by altering the center distances of the gear set to the point that the gear teeth are in contact with other and by using a split worm to remove backlash by rotating the two halves of the worm relative to each other so that each side of the worm loads up a different side of the worm gear. However, in all known worm gear sets using ball gears to minimize backlash, the balls tend to slide along the thread in the worm and thereby generate friction, instead of rolling as intended, when the gear set is heavily loaded.

A worm gear set which offers zero backlash, high efficiencies, long life, high torque ratings, a wide variety of ratios, and low heat generation is needed. Current worm gear designs do not possess these qualities and can not, due to the inherent limitations of their geometry.

Summary of The Invention

The split-worm gear set of this invention uses two components that have been used before to minimize backlash in a worm gear set, a split worm and a ball gear (sometimes called a worm gear). According to this invention, backlash is eliminated through the use of a split worm that is preloaded by having a first part of the worm fixed in a stationary position on the input shaft and the second part of the split worm mounted for limited axial movement along the input shaft relative to the stationary part of the split worm. Both parts of the split worm rotate with the input shaft, unlike the prior art.

The ball gear uses recirculating balls instead of gear teeth to transmit the tangential load from one gear member to the other. The balls roll through ground grooves in the worm halves and thus drive the worm gear. The balls recirculate through an internal passage extending through the two parts of the split worm. The ends of the internal passage communicate with the grooves on the exterior of the split worm.

The balls are prevented from sliding as in the prior art by the unique profile of the gear teeth on the ball gear. Each ball is successively contacted by adjoining flanges of its gear tooth as it moves along the groove in the worm to transmit torque from the input shaft to the output shaft.

The operation of the split-worm gear set of this invention is somewhat analogous to the operation of a ball screw with the exception that rotary motion is achieved instead of linear motion.

DETAILED DESCRIPTIN OF THE INVENTION

Figure 6:
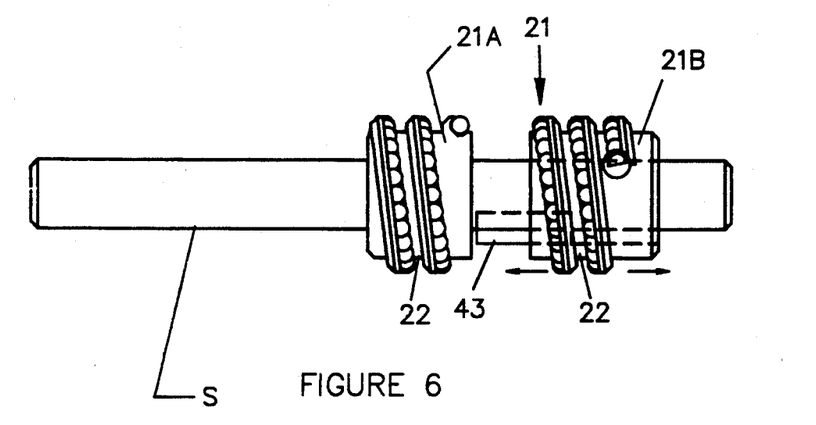
FIG. 6 is a side view of the two parts of the split-worm operatively assembled on the input shaft.
Figure 7:
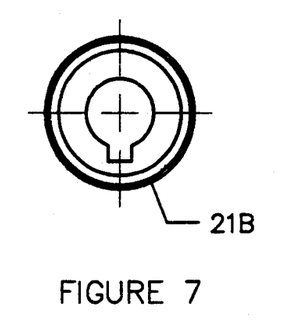
FIG. 7 is an end view of the axially movable part of the split-worm.
Figure 8:
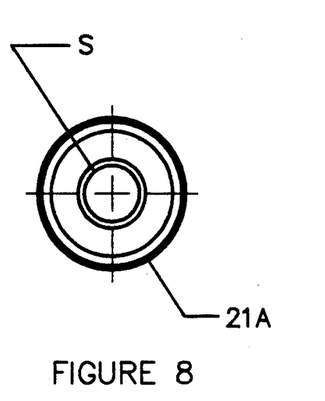
FIG. 8 is an end view of the stationary part of the split-worm.
Figure 9:
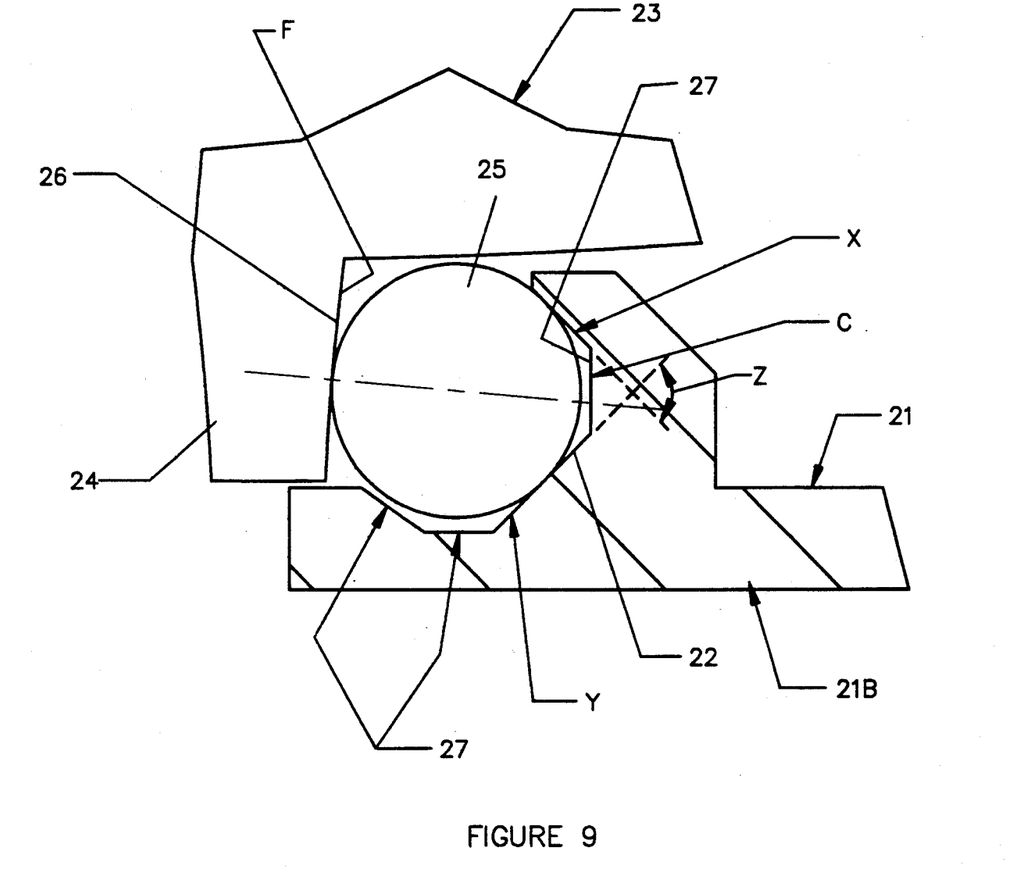
FIG. 9 is an enlarged cross-sectional view illustrating the areas of the split-worm and worm gear contacted by a ball during normal operation.

Referring more specifically to the drawings, the split-worm gear set of this invention is broadly indicated at 20. It includes a split worm, broadly indicated at 21 in FIG. 6, and comprising a stationary part 21A and a movable part 21B. The split worm 21 is mounted for rotation with an input shaft S. The stationary part 21A is fixed against axial movement on the input shaft S while the movable part 21B is mounted for limited axial movement along the input shaft S relative to the stationary part 21A. A thread or groove, broadly indicated at 22, extends helically around the two parts, 21A and 21B of the worm 21.

A worm gear, broadly indicated at 23, is fixed to an output shaft T and comprises teeth 24 engageable with groove 22 in the worm 21. Balls 25 and 25A are preloaded into the split worm 21 and roll between the worm groove 22 and faces or flanks 26 of successive teeth 24, responsive to rotation of the input shaft S. As the input shaft S is rotated, the balls 25 and 25A will be forced to roll between the split worm 21 and the worm gear 23.

The split-worm and worm gear set is mounted in a conventional gearbox having a gear housing 30, and end caps 31 and 32, seals 33 and 34, thrust bearing 35, spacer 36, needle bearings 37 and 38, spacer 40, thrust bearing 41, and output shaft T.

The illustrated embodiment shows one method of split-worm and worm gear mounting. Other methods, such as tapered roller bearings or angular contact bearings, would also be quite suitable, depending on the application.

Figure 1:
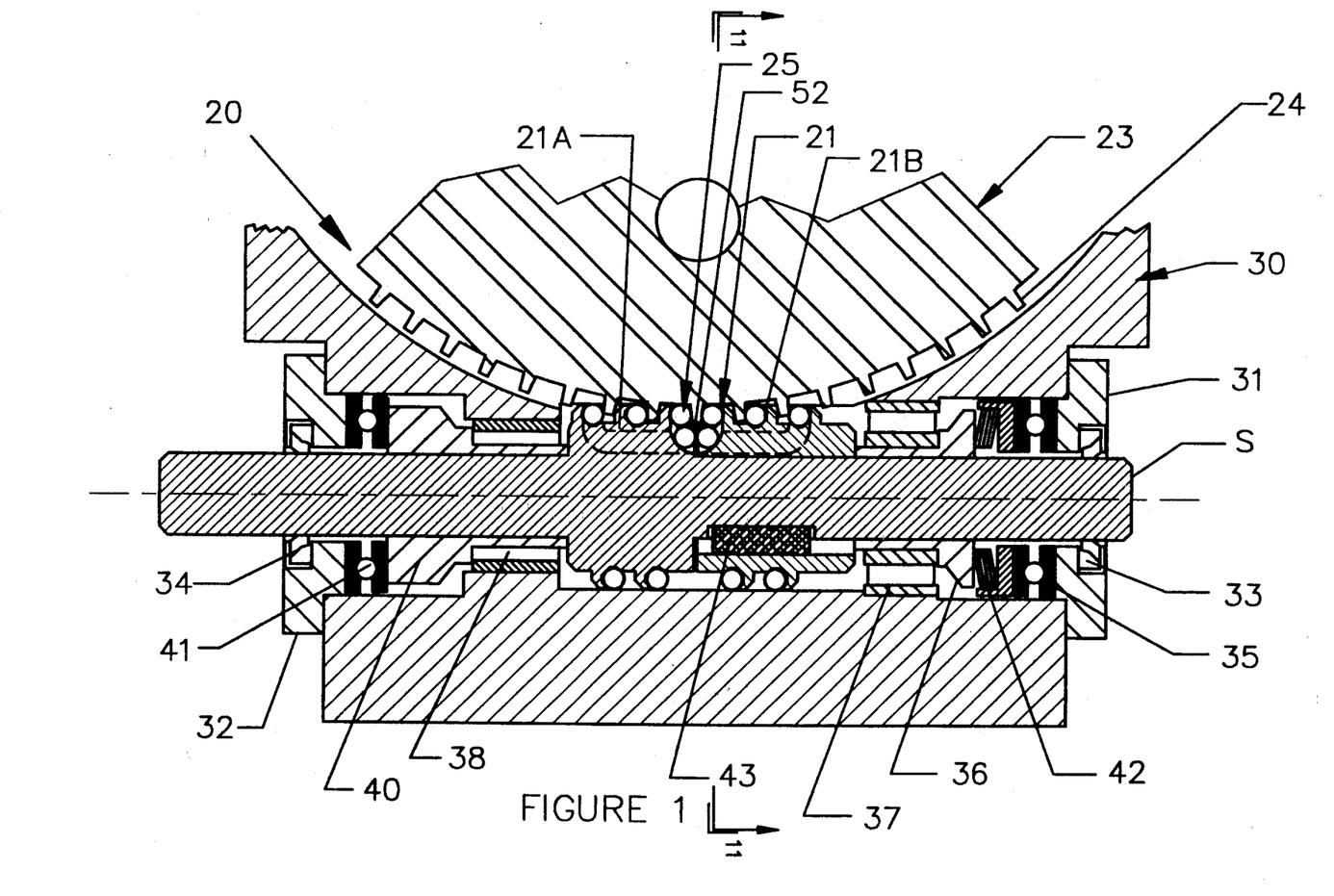
FIG. 1 is a sectional view, with parts broken away, of the split-worm gear set of this invention.

Zero backlash is obtained by preloading the stationary worm part 21A and the movable worm part 21B against each other. FIG. 1 shows the worm preloaded inward by a set of belville washers 42. A solid member could be used in lieu of the springs in the belville washer, depending on the manufacturing tolerances of the gears. The equal and opposite loads will act to clamp the worm gear and thus reduce the possibility of backlash.

A small amount of axial freedom will be required in the movable worm part 21B to allow it to close in any clearance between the balls and mating flanks on the worm gear for initial adjustment. Split worm part 21B is mounted on a key 43 protruding from the input shaft S so that movable worm part 21B is free to slide axially, but not rotate, relative to the stationary worm part 21A.

In order that the balls are able to translate in either direction as they rotate around the worm, a recirculation track 44 (FIG. 2) is provided inside the two parts 21A and 21B of the split worm 21. The track 44 allows the balls to run off the end of the thread 22 on the left side of FIG. 1, recirculate, and come out on the right side of the worm part 21B in FIG. 2.

In the illustrated embodiment of the invention, two sizes of balls are used in order to prevent the balls from skidding or sliding. The smaller balls 25A (FIG. 2) are arranged alternately with the larger balls 25 to allow the smaller balls 25A to be trapped between the larger balls 25 and keep the larger balls 25 from rubbing against each other and skidding. This alternate arrangement of small ball 25A and larger ball 25 results in the smaller balls 25A actually rotating in the opposite direction from the larger balls 25, which will be in direct contact with the parts of the split-worm and with the ball gear.

By varying the ball diameters, the load ratings of the split-worm gear set can be altered to fit the need. Larger grooves 22 will be required for larger balls. The difference in size between the small balls 25A and the larger balls 25 is microscopic and not apparent to the observer. The difference in diameter is in the range of 0.000050 of an inch to 0.000100 of an inch, but has been greatly exaggerated in FIG. 2 for the purpose of illustration.

The two worm parts, 21A and 21B, together form a straight profile with the outer edge of the split-worm 21 parallel with the axis of the input shaft S. This profile can be seen in FIG. 6. The straight profile of the split-worm 21 allows the worm profile to follow the ball gear profile because the centerline of the input shaft, on which the worm is mounted, is perpendicular to the centerline of the output shaft T, on which the ball gear 23 is mounted.

Figure 5:
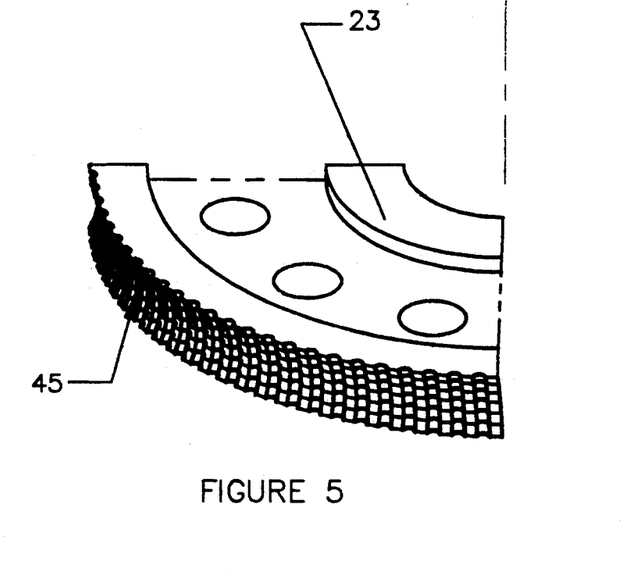
FIG. 5 is a perspective view of the worm gear, with parts broken away, showing its sectioned teeth.

The face 45 of the ball gear 23 is concave, as shown in FIG. 5, to allow for maximum contact with the larger balls 25 between the split-worm 21 and the ball gear 23. The balls 25 and 25A repeatedly roll on and off the concave face 45 of the ball gear 23. The housing of the split-worm 21 is machined so that the balls make a smooth transition on and off the face 45 of the ball gear 23.

The balls 25 and 25A continue to follow the groove 22s in the split-worm 21 even when the balls are not in contact with the ball gear face 45. Lead-in ramps are provided on the ends of the worm 21 to facilitate transition of the balls from the flanks of the teeth on the ball gear 23. The inlet hole 46 and outlet hole 47 of the recirculation track 44 through the split-worm 21 are oriented tangentially on the worm face relative to each other so that as one ball leaves the groove 22 in the worm and enters the inlet hole 46, another ball will be entering the groove 22 from the outlet hole 47 at the other end of the worm 21. This equalization of the exit and entrance of the balls contributes to the smoothness of operation of the split-worm gear set.

Figure 2:
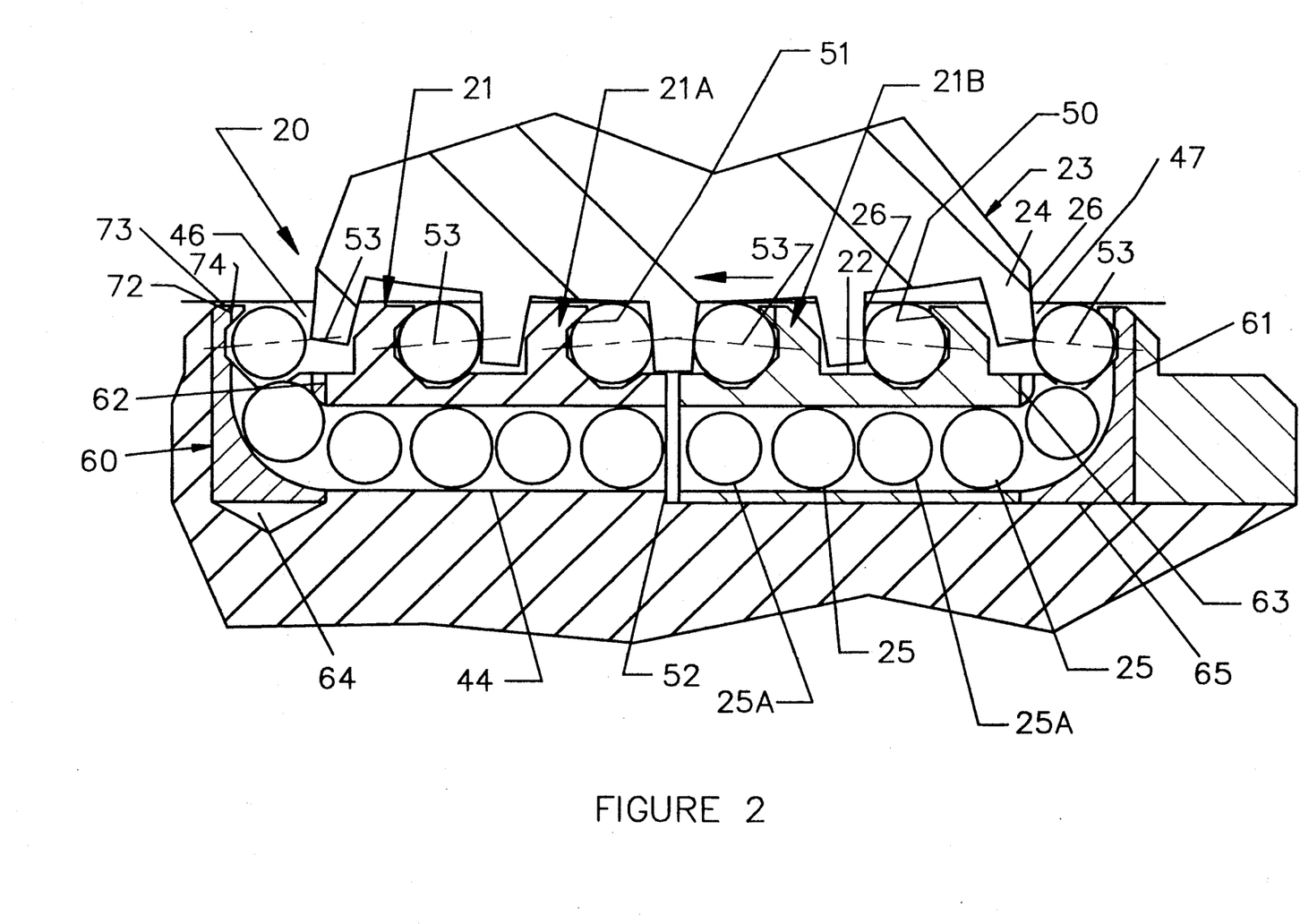
FIG. 2 is a view similar to FIG. 1 but is enlarged and shows the split-worm, worm gear, balls, and the recirculation channel in operable relation to each other.

Referring to FIG. 2, as each ball travels along the face of axially movable split-worm part 21B, it will load profiled flank 50 of the groove 22 in the split-worm part 21B and will be switched to load the opposing profiled flank 51 on the split-worm part 21A.

A transition region is provided at 52 between the two worm parts 21A and 21B, in which the ball will not load either flank of the groove 22. The depth of the groove 22 in the split-worm 21 increases slightly on both sides of the transition region 52, thus providing a clearance area that removes any loading of the flanks of the groove 22. After the ball rolls beyond the transition region 52, it moves into the normal depth of the groove 22 and is loaded against the profiled flank 51 of the groove 22 on the stationary worm part 21A (FIG. 2). The gap 52 permits maximum contact area between the ball and the two surfaces of the profiled flank contacted by the ball. The provision of maximum contact area keeps the stresses on the ball at or below the acceptable level.

The centerline for each ball is indicated at 53 in FIG. 2. The centerlines 53 represent the axis of contact of their respective balls. The velocity of each ball relative to the ball gear tangent lines and the ball groove 22 centerline must remain constant. This will keep the balls from piling up on each other and will also stabilize the loading of each ball no matter where it is along the ball path.

Ball guide inserts 60 and 61 make the ninety degree turns at the ends of the recirculation track 44 and provide communication between the track 44 and ball groove 22. The inserts 60 and 61 are pressed into the ends of the split-worm 21, insert 60 being at the outer end 62 of the stationary part 21A of the split-worm 21 and insert 61 being at the outer end 63 of the axially movable part 21B of the split-worm 21 (FIG. 2).

Figure 3:
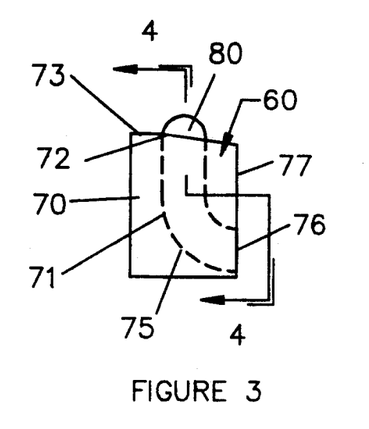
FIG. 3 is a perspective view, with parts broken away and partially in section, of one of the ball guide inserts, removed from the split-worm, that provides communication between the helical groove in the stationary portion of the split-worm and the corresponding end of the recirculation channel through the split-worm.
Figure 3A:
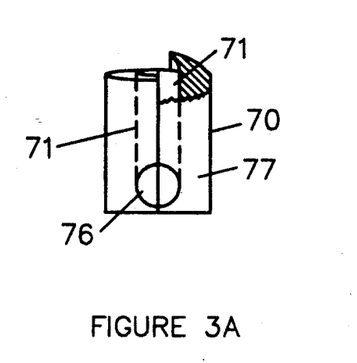
FIG. 3A is a side view, with parts broken away and partially in section, of the ball guide insert shown in FIG. 3.
Figure 3B:
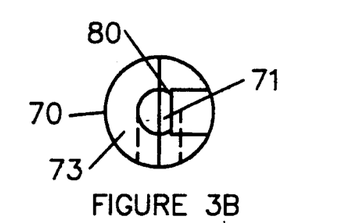
FIG. 3B is top view of the ball guide insert shown in FIG. 3.
Figure 4:
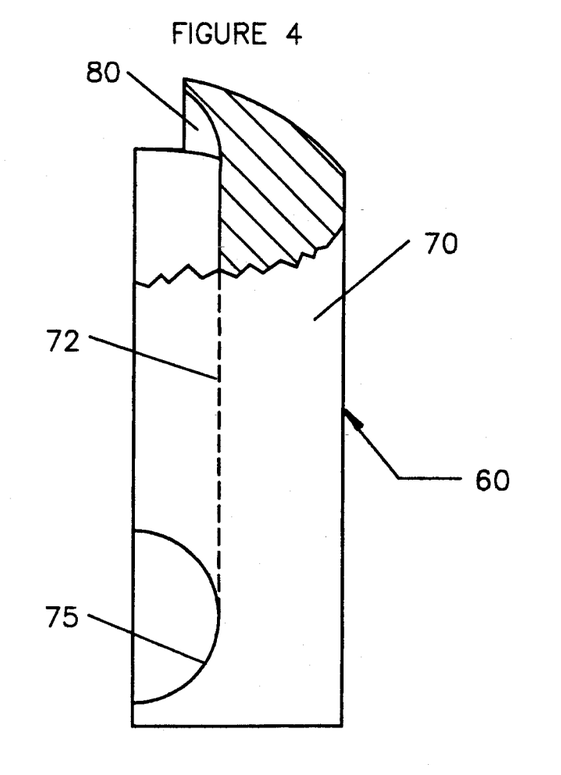
FIG. 4 is a sectional view taken substantially along the line 4—4 in FIG. 3.

FIGS. 3, 3A, and 3B show the ball guide insert 60 removed from the worm 21. Both of the inserts 60 and 61 are first machined to form angular passageways and then pressed into respective holes 64 and 65 drilled into the split-worm 21 at the opposite ends of the two worm halves 21A and 21B. The inserts 60 and 61 are sufficiently alike that a description of insert 60 is considered sufficient for an understanding of both inserts.

The insert 60 is a steel block 70 (FIG. 3) that has been machined to form a passageway 71 through the block 70. The passageway 71 extends straight down from an opening 72 in the top wall 73 of the block 70 to a curved portion 75 of the passageway 71. The curved portion 75 extends through an arc of 90° and the passageway 71 communicates at 76 with side wall 77 of block 70.

The opening 72 in top wall 73 communicates with the groove 22 in the fixed portion 21A of split-worm 21 and an upstanding flange 80 directs successive balls 25, 25A from the groove 22 into the opening 72 of passageway 71.

The insert 61 is similarly machined from another steel block, like the block 70, to form a duplicate of the insert 60 with another angular passageway, like the angular passageway 71. The insert 61 has a ramp 80A, like the ramp 80, to accomodate the balls when they move in the opposite direction than indicated in FIG. 2.

The insert 61 is oriented with the inner end of its angular passageway, corresponding to the passageway 71 in insert 60, positioned for alinement with the recirculation track 44 and then pressed into the hole 65 in the outer end of worm half 21B. The inserts 60 and 61 thus provide communication between the track 44 and groove 22.

The track 44 is formed by holes drilled axially into each worm half, which intersect the insert holes 64 and 65, as shown in FIG. 2.

FIG. 2 illustrates the preferred design of ball groove 22. Each ball 25 and 25A is successively trapped between a worm gear tooth 26 and the worm groove 22. The groove 22 on the worm 21 includes a V-shaped radius clearance portion 27 and a contact portion consisting of contact flats X and Y separated by a spacer flat C. The angle between the two contact flats X and Y is determined by the length of the spacer flat C, which, in turn, is determined by the size of the balls 25 and 25A so as to make the angle Z between contact flats X and Y as close to 180° as possible. This will bring the contact points on the ball 25 or 25A close together. The objective is to make sure the angle is small enough to capture the ball and yet large enough to produce a rolling action instead of a spinning action, which would wear the balls faster and result in lower efficiencies.

Figure 11:
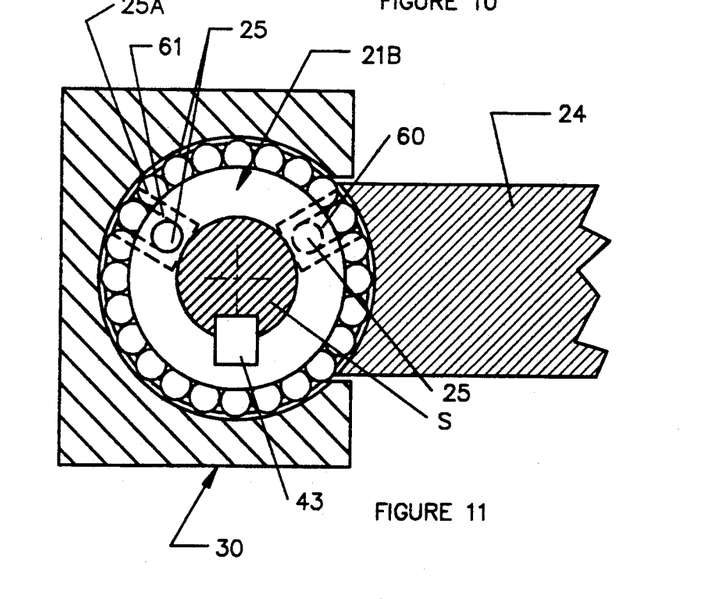
FIG. 11 is a sectional view taken substantially along the line 11—11 in FIG. 1 and illustrating the relationship of the split-worm, the worm gear, the balls, and the gear housing.

As stated earlier, it is important that the tangential velocity of the center of each ball relative to the worm remain constant. As the ball travels axially down the worm groove 22, the contact angle between the ball center and the worm gear flanks X and Y (FIG. 11) may vary depending on the ball gear parameters used. This could result in a variance of ball velocity. In order to compensate for a varying ball velocity, the angle Z between the two ball contact flats X and Y on the worm groove 22 is varied as the groove progresses axially along the worm exterior. This does not change the worm or worm gear contact surface velocities, but does alter the ball center velocity because its speed is a function of the relative surface speeds of the members it contacts and the distance between those surfaces.

The ball flank profile is generated on each side of the worm gear teeth 26 because the right profile will be contacted by the right worm half and the left profile will be contacted by the left worm half.

Figure 10:
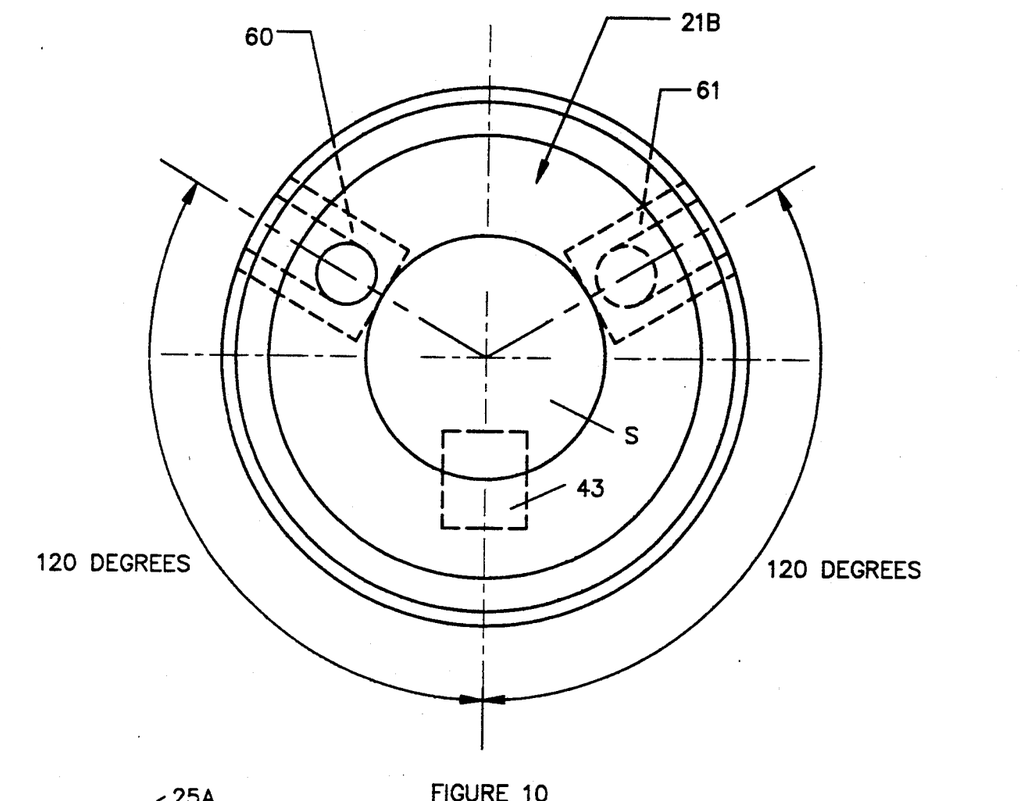
FIG. 10 is an end view of the assembled stationary and movable parts of the split-worm, illustrating the positions of the recirculating grooves and the key for the movable part of the split-worm.

In the illustrated embodiment (FIG. 10), the inserts 60 and 61 are each circumferentially spaced 120° from the key 43 that prevents rotation of the worm portion 21B relative to the shaft S. This provides the balance that is needed for smooth trouble-free operation.

There is thus provided an improved worm gear set utilizing a ball gear cooperating with a ball recirculation track in the worm, and wherein the worm is a split-worm with a stationary part and an axially movable part to allow for backlash adjustment. The ball groove 22 in the split-worm is configured to capture the individual balls for rolling instead of spinning to prolong the useful life of the assembly and to improve efficiencies.

I claim:

1. A worm gear set comprising:
   (a) an input shaft;
   (b) a split-worm including:
      (1) a stationary part fixed to the input shaft for rotation therewith;
      (2) an axially movable part mounted for rotation with the input shaft and
      (3) means supporting the axially movable part of the split-worm for floating axial movement relative to the stationary part of the split-worm to provide for backlash adjustment;
   (c) a worm gear;
   (d) a supply of balls;
   (e) means responsive to rotation of the input shaft for positioning successive balls between the split-worm and the worm gear;

(f) said last-named means comprising:
  (1) a ball groove extending helically around the exterior of the split-worm;
  (2) the ball groove including for each ball in the ball groove:
    (i) a radius clearance portion normally spaced from the ball and
    (ii) a contact portion including two contact flats spaced from each other and engageable with the ball.

2. A worm gear set according to claim 1 which includes a recirculation track extending through the split-worm, and means providing communication between the recirculation track and the ball groove.

3. A worm gear set according to claim 1 wherein the contact portion includes a spacer flat extending between the two contact flats, and the length of the spacer flat being correlated to the diameter of the ball to place the two contact flats in substantially perpendicular relation to each other.

4. A worm gear set according to claim 3 wherein the length of the spacer flats in the helical ball groove progressively change to maintain constant ball tangential velocity of the worm.

5. A worm gear set according to claim 1 wherein the supply of balls includes a first group of balls of a given size and a second group of balls of a smaller size.

6. A worm gear set according to claim 5 wherein balls from the first group are arranged alternately with balls from the second group.

7. A worm gear set according to claim 1 wherein said means supporting the axially movable part of the split-worm includes resilient means for imparting reciprocal axial movement of said movable part relative to the stationary part of the split-worm.

* * * * *